United States Patent [19]

Cuscurida et al.

[11] Patent Number: 4,523,025

[45] Date of Patent: Jun. 11, 1985

[54] POLYMER POLYOLS FROM PARTIALLY REACTED POLYAMINES

[75] Inventors: Michael Cuscurida; Howard P. Klein, both of Austin, Tex.

[73] Assignee: Texaco Inc., White Plains, N.Y.

[21] Appl. No.: 544,200

[22] Filed: Oct. 21, 1983

[51] Int. Cl.³ .......................................... C07C 125/077
[52] U.S. Cl. ..................................... 560/26; 521/159; 428/160; 560/115; 252/182
[58] Field of Search .................................. 560/26, 115

[56] References Cited

U.S. PATENT DOCUMENTS 4,296,213 10/1981 Cuscurida et al. ............ 521/166 X
4,309,532 1/1982 Cuscurida et al. .................... 536/4

Primary Examiner—Bernard Helfin
Attorney, Agent, or Firm—Jack H. Park; Kenneth R. Priem; David L. Mossman

[57] ABSTRACT

A polymer polyol made by the reaction of a partially reacted polyamine with an organic polyisocyanate in a polyether polyol solvent of about 3,000 to 8,000 molecular weight is disclosed. Preferably, the polyisocyanate is reacted with a partially alkoxylated polyoxyalkylenediamine. This polymer polyol may be used in the manufacture of flexible polyurethane foams with improved properties. The polymer polyols are more stable than those made by other procedures.

5 Claims, No Drawings

POLYMER POLYOLS FROM PARTIALLY REACTED POLYAMINES

CROSS-REFERENCES TO RELATED APPLICATIONS

This application is related to patent application Ser. No. 513,599 filed on July 14, 1983 which concerns polymer polyols made by reacting an alkylene oxide adduct of a hydroxyl containing amine with an organic polyisocyanate in a polyether polyol of 3,000 to 8,000 molecular weight. The application is also related to patent application Ser. No. 515,405 filed on July 20, 1983 and now U.S. Pat. No. 4,465,858 which discloses partially alkoxylated polyoxyalkyleneamines.

BACKGROUND OF THE INVENTION

1. Field of the Invention

This invention pertains to the field of polyurethane plastics. The invention more particularly relates to polymer polyols made from partially reacted polyamines with an organic polyisocyanate in a polyether polyol solvent.

2. Description of the Prior Art

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2000 to 3000 and above. These polyols are then reacted with polyisocyanate in the presence of water or other blowing agents such as fluorocarbons to obtain polyurethane foams (see, for example, U.S. Pat. No. 2,929,800). The prior art describes modified polyols in which vinyl monomers such as styrene or acrylonitrile or other materials such as the reaction products of toluene diisocyanate and hydrazine hydrate have been included to improve the properties of the polyol and thus, the properties of the resulting foam. However, some of these prior art materials are highly toxic and require in addition, stripping of unreacted vinyl monomers or water of hydration. U.S. Pat. No. 4,107,102 describes the manufacture of polyurethane foam using a polyol containing hydrazine and its adducts.

Ureido-polyols for polyurethanes are known to be made simply by reacting an alkanolamine with an organic isocyanate according to U.S. Pat. No. 3,294,751. No solvent polyol seems to be used.

German Offenlegungsschrift No. 2,110,055 discloses a process for making a polyurethane product whereby an unreacted hydroxyl-containing amine is included in the formulation in a one-shot process. The German process does not use a polyurea polymer polyol which is then reacted with a polyisocyanate.

U.S. Pat. No. 3,325,421 discloses the method of making a stable dispersion of a urea in a composition comprising an organic polyisocyanate and a compound having at least two alcoholic hydroxyl groups.

Stable dispersions of polyureas can be prepared from mixtures consisting of hydroxyl-group containing materials, polyamines and polyisocyanates as taught by U.S. Pat. No. 4,089,835. The dispersing media may be a polyether, a polyester, a polyester amide or a polycarbonate, while the polyamine should contain primary or secondary amine groups.

British Pat. No. 2,098,229 discloses that polymer polyols for use in urethane foams may be made by reacting triethanolamine with a polyisocyanate in the presence of a polyols solvent. Polyurea polymer polyols made by the reaction of alkanolamines with polyisocyanates in the presence of polyether polyols and absence of a catalyst, may be stabilized by quenching with a secondary amine as described in U.S. Pat. No. 4,293,470.

A method for the preparation of stable dispersions of polyisocyanate polyaddition products by reacting organic polyisocyanates with compounds having primary and/or secondary amino groups or primary hydroxyl groups in polyols is taught by U.S. Pat. No. 4,093,569. The reaction is carried out in the presence of 4 wt.% water.

Other disclosures concerning the production of polymer polyols by the reaction of alkanolamines with polyisocyanates in a polyol solvent are U.S. Pat. Nos. 4,374,209 and 4,296,213. Particularly, the present invention is an improvement on the latter method in that partially alkoxylated polyoxyalkyleneamines are used to produce polymer polyols more stable (no phase separation) than those of U.S. Pat. No. 4,296,213.

SUMMARY OF THE INVENTION

The invention is a polymer polyol made by reacting an adduct with an organic polyisocyanate in a polyether polyol solvent of about 3,000 to 8,000 molecular weight. The adduct is the product of the partial reaction of an alkylene oxide, acrylonitrile or an acrylic ester with a polyoxyalkyleneamine or a polyalkyleneamine. The ratio of equivalents of the adduct to equivalents of polyisocyanate ranges from about 1:1 to 2:1. The combined weight of the adduct and the polyisocyanate is about 5 to 25 wt.% of the polyether polyol solvent.

DESCRIPTION OF THE PREFERRED EMBODIMENTS

Polyamine Adducts

Generally, the polyamines suitable for partial reaction to form adducts useful in the instant polymer polyols are polyoxyalkyleneamines and polyalkyleneamines. A preferred group of polyamines are those having the following formulae

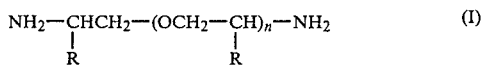

$$NH_2-CHCH_2-(OCH_2-CH)_n-NH_2 \qquad (I)$$
$$\qquad \quad | \qquad \qquad \quad |$$
$$\qquad \quad R \qquad \qquad \quad R$$

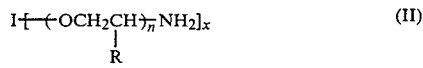

$$I\!\!-\!\!\left[\!-\!(OCH_2CH)_{\overline{n}}NH_2\right]_x \qquad (II)$$
$$\qquad \qquad |$$
$$\qquad \qquad R$$

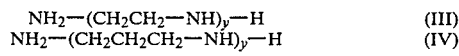
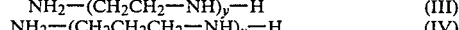

$$NH_2-(CH_2CH_2-NH)_y-H \qquad (III)$$
$$NH_2-(CH_2CH_2CH_2-NH)_y-H \qquad (IV)$$

where R is an alkyl group of from 1 to 4 carbon atoms, n ranges from 1 to 35, x is 3 and y ranges from 1 to 5. I is a trifunctional initiator such as glycerine, trimethylolpropane or triethanolamine.

Another preferred way of categorizing the polyalkylenepolyamines is by stating that the "alkylene" moiety has between 2 and 6 carbon atoms such as ethylene, propylene and 1,2-butylene, and the molecular weight of the polyamines is between 200 and 5,000. A particularly preferred group are the polyoxypropylenediamines, polyoxypropylenetriamines, ethyleneamines and propyleneamines.

Polyoxyalkyleneamines are well known and can be made by treating the corresponding polyoxyalkylene polyols with ammonia and hydrogen over a catalyst prepared by the reduction of a mixture of oxides of nickel, copper and chromium. For more details on the preparation of the polyoxyalkyleneamines used herein, see U.S. Pat. No. 3,654,370, incorporated by reference herein. A particularly popular brand of amines are the JEFFAMINE® polyoxypropyleneamines sold by Texaco Chemical Company.

The especially preferred polyamines used herein are those of formula (I) set out above, particularly when R is methyl.

To form the partially reacted adducts of this invention, the polyamines described above are reacted to a limited extent with an alkylene oxide, acrylonitrile or an acrylic ester or a mixture thereof. Preferably, these co-reactants have from 2 to 8 carbon atoms. It is particularly preferred that the co-reactant be an alkylene oxide having from 2 to 8 carbon atoms. It is especially preferred that ethylene oxide, 1,2-propylene oxide or 1,2-butylene oxide be used. The most preferred form is a mixture of ethylene oxide and propylene oxide. An alternative embodiment involves first adding a small amount of ethylene oxide to the polyamine (from 0.25 to 10 wt.% total alkylene oxide charge), and then in a subsequent step finishing the reaction by adding propylene oxide under identical reaction conditions. Digestion takes place after the addition of both oxides.

The amount of alkylene oxide, acrylonitrile or acrylate ester added to the amine reactant depends on the desires of the experimenter. However, the proportion of alkylene oxide, acrylonitrile or acrylate ester must be less than that required to totally saturate the amine. For example, if the polyamine is a diamine where both amino groups are primary, the moles of alkylene oxide should be less than four for each mole of amine reacted. If a triamine is used and each amino group is primary, the mole ratio of alkylene oxide to amine must be less than 6:1. Some reactive amine nitrogens must be left. Another way of stating this is to say that the tertiary amine content is less than 90%.

From about 1 to 15 wt.% water is preferably present, based on the quantity of amine reactant. Polyalkyleneamine already in aqueous solution is permissible, otherwise the water should be added. However, it is possible to prepare the adduct in the absence of water.

Generally, the reaction is conducted by first adding water to the polyamine and then adding and reacting the alkylene oxide, acrylonitrile or acrylate ester (preferably alkylene oxide) at an elevated temperature. The temperature of the addition step should be in the range from 75° to 85° C., which is surprisingly low. It is also unusual that the alkylene oxide can be introduced rather quickly in less than half an hour, whereas in prior methods the period of addition is typically ten hours.

Subsequent digestion of the reactants generally occurs at a temperature in the range of about 75° to 135° C. for about three hours, although the time is not critical. This digestion temperature is surprisingly low compared to the prior art. The desired product is usually purified by stripping. Note that no catalyst is needed in this phase of the polymer polyol preparation.

The reaction may be conducted in either a batch or a continuous mode. Pressures in the range from ambient to 100 psig are permissible.

The reaction products or adducts of alkylene oxides, acrylonitrile or acrylic esters with polyoxyalkyleneamines or polyalkylenediamines may be represented by the following structures

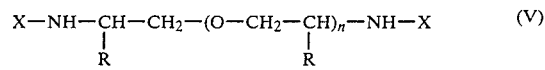

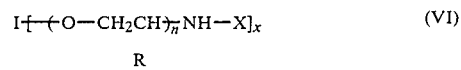

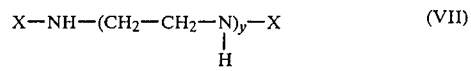

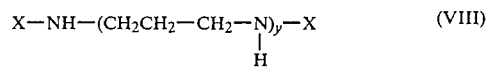

where X is selected from the group consisting of hydroxyalkyl, cyanoalkyl, acrylate and methacrylate groups where alkyl means from 2 to 8 carbon atoms. R, n, x, y and I are defined as above. Of course, as a practical matter many of these adducts will not be terminated only with secondary amine groups. Some will contain completely unreacted primary amine groups, some will contain completely reacted tertiary amine groups and some will contain mixtures of these possibilities. What is important is that the reactive amine hydrogens are not completely used up, some being available along with hydroxyl groups to react with the polyisocyanate to form the polymer.

Polyether Polyol Solvent

The polyether polyol solvent which is used has a hydroxyl number preferably between about 20 and 60. The polyol is generally an alkylene oxide adduct of a polyhydric alcohol with a functionality of from about 2 to about 4. The alkylene oxide may suitably be ethylene oxide, 1,2-propylene oxide, or 1,2-butylene oxide or a mixture of some or all of these. The polyol will preferably have a molecular weight within the range of from about 2,000 to about 8,000 and more preferably, from about 3,000 to about 7,000. The alkylene oxide is preferably propylene oxide or a mixture of propylene oxide and ethylene oxide.

The polyether polyol solvent can be a mixed alkylene oxide/diepoxide adduct of a polyhydric initiator, such as those described in U.S. Pat. Nos. 4,316,991; 4,309,532 and 4,323,658, incorporated by reference herein.

Organic Polyisocyanate

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley. Especially preferred are aromatic and aliphatic diisocyanates. Particularly preferred are toluene diisocyanate, diphenylmethane diisocyanate, isophorone diisocyanate and methylene biscyclohexylisocyanate.

Polymer Polyol Manufacture

Since the polymer polyol has by definition free hydroxyl groups, the amount of polyisocyanate used to form the polymer polyol is less than the stoichiometric amount needed to satisfy the active hydrogens of the hydroxyl groups of the polyether polyol and the partially reacted adduct's active amine hydrogens. Therefore, the ratio of equivalents of adduct to equivalents of polyisocyanate ranges from about 1:1 to 2:1.

Preferably, the combined weight of alkoxylated alkanolamine and polyisocyanate is from about 5 to 25 wt.% of the polyether polyol solvent.

The active amine hydrogen containing adduct amine and polyisocyanate can be successfully reacted without application of external heat and at atmospheric pressure although higher temperatures and pressures would also be acceptable.

The partially alkoxylated polyamines described in this invention have a controlled reactivity with diisocyanates so that stable polymer polyols can be prepared.

Polyurethane Product Formation

The polymer polyol prepared from the above ingredients is subsequently incorporated into a formulation which results in a polyurethane product. The polymer polyol may be used in conjunction with a polyisocyanate such as those mentioned above or may be combined with additional polyol such as those mentioned above and reacted with a polyisocyanate to form a resulting polyurethane foam product.

In order to form a polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicylaldehyde, cyclopentanone-1-carboxylate, acetylacetoneimine, bisacetylacetone alkylenediamines, salicylaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polymer polyol and any additional polyol present. The organic blowing agents optionally used along with the water are known in the art and are, for example, monofluorotrichloromethane, difluorocdichloromethane, methylene dichloride and others generally known in the art.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE 1

This example will illustrate the preparation of the two mole ethylene oxide/propylene oxide adduct of a 230 molecular weight polyoxypropylenediamine (JEFFAMINE ® D-230; Texaco Chemical Co.)

Into a one-half gallon stirred autocalve were charged 800 g of JEFFAMINE D-230 and 80 g of water. The reactor was then purged with nitrogen. Ethylene oxide (44 g) was then reacted at 80°–85° C. at 25 psig. Propylene oxide (400 g) was then reacted at 80°–85° C. at 30 psig. The oxide addition time was approximately 0.67 hour. The reaction mixture was then digested two hours at 80°–85° C. This was followed by a three hour digestion at 125° C. After the digestion cycle, the product was stripped to a minimum pressure at 125° C., cooled to 100° C., and polish filtered. The finished material had the following properties:

Total acetylatables, meq/g: 9.7
Total amine, meq/g: 5.35
Primary amine, meq/g: 0.53
Secondary amine, meq/g: 3.01
Tertiary amine, meq/g: 1.81
Color, Pt-Co: 25–30

EXAMPLE 2

Into a one-liter four-necked flask equipped with a stirrer, thermometer, dropping funnel, condenser, and nitrogen source were charged 450 g of a 5000 molecular weight high reactivity glycerine-based triol (THANOL ® SF-5505; Texaco Chemical Co.) and 32 g of the partially alkoxylated JEFFAMINE ® D-230 of Example 1. Toluene diisocyanate (18 g) was then added dropwise over a 15 minute period. With no external heat applied, the reaction temperature peaked at 36° C. within a one hour period. The reaction mixture was then stirred an additional 1.5 hours during which time the temperature had dropped to 32° C. The resultant product was a white, opaque, viscous dispersion which had the following properties:

Amine content, meq/g: 0.26
Hydroxyl no., mg/KOH/g: 47.5
Viscosity, 77° F., cps: 3990
Equivalents partially alkoxylated JEFFAMINE D-230/TDI: 1.5

EXAMPLE 3

This example will illustrate the preparation of the polymer polyols of this invention using a 1.25 eq. ratio of partially alkoxylated JEFFAMINE D-230 to toluene diisocyanate.

Into a one-liter four-necked flask equipped with a stirrer, thermometer, dropping funnel, condenser, and nitrogen source were 450 g of THANOL SF-5505 and 29.85 g of the partially alkoxylated JEFFAMINE D-230 of Example 1. Toluene diisocyanate (20.15 g) was then added dropwise over a ten minute period. The reaction temperature gradually rose from 24° C. to 39° C. over a 2.5 hour period at which time it was stopped. The resultant product was a white, opaque, viscous dispersion which had the following properties:

Amine content, meq/g: 0.14
Hydroxyl no., mg KOH/g: 47.7
Viscosity, 77° F., cps: 4820

EXAMPLE 4

This example will illustrate the uncontrolled reaction which occurs when JEFFAMINE D-230 was reacted with toluene diisocyanate in the presence of THANOL SF-5505 polyol. Into a wide-mouthed eight-ounce bottle was charged 90 g of THANOL SF-5505 and 6.7 g of JEFFAMINE D-230. These components were then thoroughly mixed. Toluene diisocyanate (3.3 g) was then added slowly with vigorous stirring. The reaction mixture immediately started to gel and solids came out of solution.

EXAMPLE 5

This example will illustrate the use of the polymer polyols of Examples 2 and 3 in the preparation of high resilience foam. It will further show the stabilizing effect of these polymer polyols as stable foams could not be prepared when they were omitted in a control formulation.

Formulations, details of preparation, and properties are shown in the following table:

| Foam no. | A | B | C |
|---|---|---|---|
| Formulation, pbw | | | |
| THANOL SF-5505 | 60 | 60 | 100 |
| Polymer polyol of Ex. 2 | 40 | — | — |
| Polymer polyol of Ex. 3 | — | 40 | — |
| Water | 4.1 | 4.1 | 4.1 |
| THANCAT TD-33[1] | 0.45 | 0.45 | 0.25 |
| NIAX A-1[2] | 0.08 | 0.08 | 0.25 |
| THANCAT DM-70[3] | 0.3 | 0.3 | 0.25 |
| FOMREZ UL-1[4] | 0.01 | 0.01 | 0.01 |
| L-5309 silicone[5] | 2.0 | 2.0 | 2.0 |
| 80/20 toluene diisocyanate/ MONDUR MR[6] | 50.9 | 51.0 | 50.0 |
| Isocyanate index | 1.02 | 1.02 | 1.02 |
| Details of Preparation | | | |
| Cream time, sec. | 12 | 12 | 10 |
| Rise time, sec. | 145 | 140 | 120 |
| Gel time, sec. | 350 | 270 | 210 |
| Properties | | | |
| Foam appearance | Good | Good | Foam shrank badly, could not get properties |
| Density, pcf | 1.94 | 1.78 | |
| Firmness by Chatillon[7] gauge, 25%, lb | 3.43 | 3.17 | |

[1]33% triethylenediamine in propylene glycol; Texaco Chemical Co.
[2]70% bis-dimethylaminoethyl ether in dipropylene glycol; Union Carbide Chemical Corp.
[3]70% dimorpholinodiethyl ether 30% dimethylpiperazine; Texaco Chemical Co.
[4]Organotin compound; Witco Chemical Co.
[5]Union Carbide Chemical Corp.
[6]2.7 functionality polymeric isocyanate; Mobay Chemical Co.
[7]Manual Model LIC Compression Tester manufactured by John Chatillon and Sons, Inc.

Many modifications may be made in the polymer polyols of this invention without departing from the spirit and scope thereof, which are defined only by the appended claims. For example, it may be found that a particular proportion of co-reactant to polyamine, or proportion of isocyanate or reaction temperature or modes of addition imparts advantageous or improved properties to the polymer polyol or a polyurethane foam made therefrom.

I claim:

1. A polymer polyol made by the process comprising
a. reacting
   (1) a compound selected from the group consisting of compounds of the formulae

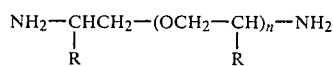

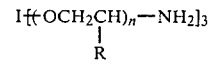

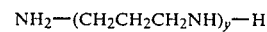

where R is an alkyl group of from 1 to 4 carbon atoms, n ranges from 1 to 35, y ranges from 1 to 5 and where I is a trifunctional initiator selected from the group consisting of glycerine, trimethylolpropane and triethanolamine with (2) a compound selected from the group consisting of alkylene oxides having 2 to 8 carbon atoms to give an adduct where the tertiary amine content of the resulting adduct is less than 90%, and b. subsequently reacting (1) the adduct from step a. with (2) An organic polyisocyanate selected from the group consisting of toluene diisocyanate, diphenylmethane diisocyanate, isophorone diisocyanate and methylene biscyclohexylisocyanate in the presence of (3) a polyether polyol solvent having a molecular weight of about 3,000 to 8,000 a hydroxyl number between about 20 and 60 and a hydroxyl functionality of from about 2 to about 4 such that the ratio of equivalents of the adduct to equivalents of polyisocyanate is from about 1:1 to 2:1 and the combined weight of the adduct and the polyisocyanate is about 5 to 25 wt% of the polyether polyol solvent.

2. The polymer polyol of claim 15 in which the reactants in step a. are a. a compound of the formula

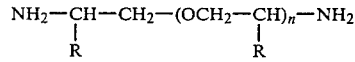

where R is an alkyl group of from 1 to 4 carbon atoms and n ranges from 1 to 35 and b. an alkylene oxide selected from the group consisting of ethylene oxide, 1,2-propylene oxide and mixtures thereof.

3. The polymer polyol of claim 1 where step a. is conducted in the presence of 1 to 15 wt.% water based on the polyamine quantity.

4. The polymer polyol of claim 1 where step a. is conducted at a temperature in the range of 75° C. to 135° C.

5. A polymer polyol made by the process comprising a. reacting (1) a compound of the formula

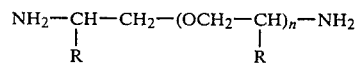

where R is an alkyl group of from 1 to 4 carbon atoms and n ranges from 1 to 35 with (2) an alkylene oxide selected from the group consisting of ethylene oxide, 1,2-propylene oxide and mixtures thereof in the presence of 1 to 15 wt.% water based on the polyamine quantity, at a temperature in the range of 75° C. to 135° C. to give an adduct where the tertiary amine content of the resulting adduct is less than 90% and b. subsequently reacting (1) the adduct from step a. with (2) an organic polyisocyanate selected from the group consisting of toluene diisocyanate, diphenylmethane diisocyanate, isophorone diisocyanate and methylene bis-cyclohexylisocyanate in the presence of (3) a polyether polyol solvent having a molecular weight of about 3,000 to 8,000, a hydroxyl number between about 20 and 60 and a hydroxyl functionality of from about 2 to about 4 such that the ratio of equivalents of the adduct to equivalents of polyisocyanate is from about 1:1 to 2:1 and the combined weight of the adduct and the polyisocyanate is about 5 to 25 wt% of the polyether polyol solvent.

* * * * *